US012760147B2

(12) United States Patent
Lee et al.

(10) Patent No.: US 12,760,147 B2
(45) **Date of Patent: *Oct. 13, 2026**

(54) TRANSITION METAL COMPLEX CATALYST COMPOSITION FOR POLYMERIZATION OF MONOMER HAVING CYCLIC ESTER GROUP AND METHOD OF PRODUCING POLYMER USING THE SAME

(71) Applicant: KYUNGPOOK NATIONAL UNIVERSITY INDUSTRY-ACADEMIC COOPERATION FOUNDATION, Daegu (KR)

(72) Inventors: Hyo Sun Lee, Daegu (KR); Jae Gyeong Lee, Gyeongju-si (KR); Saira Nayab, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 596 days.

This patent is subject to a terminal disclaimer.

(21) Appl. No.: 18/223,304

(22) Filed: Jul. 18, 2023

(65) Prior Publication Data

US 2024/0294705 A1 Sep. 5, 2024

(30) Foreign Application Priority Data

Jul. 18, 2022 (KR) ........................ 10-2022-0087932

(51) Int. Cl.
*C08G 63/82* (2006.01)
*C07F 1/00* (2006.01)
(Continued)

(52) U.S. Cl.
CPC .............. *C08G 63/823* (2013.01); *C07F 1/08* (2013.01); *C07F 3/06* (2013.01); *C07F 15/065* (2013.01); *C08G 63/08* (2013.01)

(58) Field of Classification Search
None
See application file for complete search history.

(56) References Cited

U.S. PATENT DOCUMENTS

2020/0223880 A1* 7/2020 Chinnathambi .......... C07C 5/03

FOREIGN PATENT DOCUMENTS

CN 111303214 A * 6/2020 ............ C08F 236/06
KR 10-0431024 B1 5/2004

(Continued)

OTHER PUBLICATIONS

Rivas et al., "Internal hydrogen bonding in tetrahedral and trigonal bipyramidal zinc(II) complexes of pyridine-based ligands," Dalton Transactions, Issue 17, pp. 3339-3349. (2003). (Year: 2003).*

(Continued)

*Primary Examiner* — Ha S Nguyen
(74) *Attorney, Agent, or Firm* — Paratus Law Group, PLLC

(57) ABSTRACT

The present invention relates to a transition metal complex catalyst composition for polymerization of a monomer having a cyclic ester group and a method of producing a polymer using the same. More particularly, the invention provides a catalyst composition comprising a transition metal complex containing aminopyridine and aminoquinoline ligands, and a method of producing a polymer having high heterotacticity with high conversion rate even at room temperature by using the same. Since the catalyst composition for polymerization of a monomer having a cyclic ester group according to the invention comprises a transition metal compound that is chemically stable in air, it is capable (Continued)

of effectively producing a polymer having high heterotacticity ($P_r$) with high conversion rate at room temperature or below room temperature without satisfying high-temperature conditions.

16 Claims, 2 Drawing Sheets

(51) Int. Cl.

| | |
|---|---|
| ***C07F 1/08*** | (2006.01) |
| ***C07F 3/00*** | (2006.01) |
| ***C07F 3/06*** | (2006.01) |
| ***C07F 15/06*** | (2006.01) |
| ***C08G 63/08*** | (2006.01) |

(56) References Cited

FOREIGN PATENT DOCUMENTS

| | | |
|---|---|---|
| KR | 10-2513130 B1 | 3/2023 |
| KR | 10-2609270 B1 | 12/2023 |

OTHER PUBLICATIONS

Wang et al., “A Novel Azide Copper Complex: [[Azido{bis[2-(piperidin-1-ylmethyl)pyridine]}copper(II)]perchlorate] Hydrate,” Russian Journal of Coordination Chemistry, vol. 35, No. 10, pp. 789-792, (2009). (Year: 2009).*

Jia et al., “Three copper(II) complexes derived from 2-methylquinoline and cyclic secondary amines: Synthesis and catalytic application in C N bond forming reactions,” Applied Organometallic Chemistry, vol. 36, issue 7, p. 1-11 (2022). (Year: 2022).*

Korean Office Action for related KR Application No. 10-2022-0087932 mailed Feb. 2, 2024 from Korean Intellectual Property Office.

Korean Notice of Allowance for related KR Application No. 10-2022-0087932 mailed Apr. 9, 2024 from Korean Intellectual Property Office.

Ah Rim Jeong et al., “Norbornene and methyl methacrylate polymerizations catalyzed by palladium(II) complexes bearing aminomethylpyridine and aminomethylquinoline derivatives”, Journal of Molecular Structure, May 17, 2022, pp. 1-11, vol. 1264, No. 133238.

* cited by examiner

TRANSITION METAL COMPLEX CATALYST COMPOSITION FOR POLYMERIZATION OF MONOMER HAVING CYCLIC ESTER GROUP AND METHOD OF PRODUCING POLYMER USING THE SAME

CROSS-REFERENCE TO RELATED APPLICATION

This application claims priority to Korean Patent Application No. 10-2022-0087932 (filed on Jul. 18, 2022), which is hereby incorporated by reference in its entirety.

BACKGROUND

The present invention relates to a transition metal complex catalyst composition for polymerization of a monomer having a cyclic ester group and a method of producing a polymer using the same, and more particularly, to a catalyst composition comprising a transition metal complex containing aminopyridine and aminoquinoline ligands, and a method of producing a polymer having high heterotacticity with high conversion rate even at room temperature by using the same.

Synthesis of sustainable polyesters has been of increasing interest in the last decade due to their biodegradability and biocompatibility as well as the possibility of obtaining monomers from renewable sources.

Polylactides (PLAs) have emerged as a potential alternative to conventional petroleum-based polyolefins and have been used in a variety of fields from the food and packaging industries to biomedical applications.

In general, it is known that these polylactides are formed by direct polycondensation of lactic acid or by ring-opening polymerization of lactide monomers in the presence of an organometallic catalyst. Thereamong, the direct polycondensation method has an advantage in that a polylactide may be easily produced by a simple method, but it is difficult to obtain a polymer having a high average molecular weight of 100,000 or more, and thus it is difficult to obtain a polylactide-based resin having sufficient physical and mechanical properties.

In contrast, the method for ring-opening polymerization (ROP) of a lactide monomer may yield a lactide having a large molecular weight and control the polymerization reaction, and thus it is commercially used. However, this method has a disadvantage in that, because it is necessary to produce a lactide monomer from lactic acid, the production cost is higher than that of the direct polycondensation method. In addition, the organometallic catalyst that is used in the ring-opening polymerization reaction is required to have high activity, but has the disadvantage of being unstable in air or being an expensive material, and high temperature conditions are sometimes required when a polymer is produced using the same.

Accordingly, there is a continuous need to develop catalysts with excellent performance that can effectively produce polymers even at lower process costs.

PRIOR ART DOCUMENTS

Patent Documents (Patent Document 1) Korean Patent No. 10-0431024 (published on May 10, 2004)

SUMMARY

An object of the present invention is to provide a novel transition metal compound.

Another object of the present invention is to provide a transition metal complex catalyst composition with excellent performance for polymerization of a monomer having a cyclic ester group.

Still another object of the present invention is to provide a method of producing a polymer of a monomer having a cyclic ester group using the catalyst composition.

To achieve the above objects, the present invention provides a transition metal compound represented by Formula 1 or 2 below:

[Formula 1]

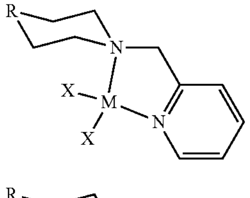

[Formula 2]

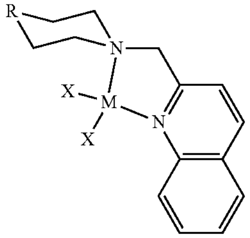

wherein M may be selected from among transition metals, R may be selected from among a $C_1$-$C_4$ alkyl group and oxygen (O), and X may be selected from among halogen elements.

The compound represented by Formula 1 may be formed as a dimer represented by Formula 3 below:

[Formula 3]

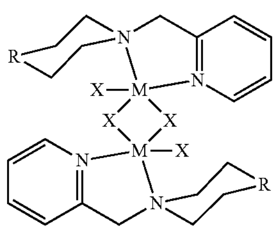

wherein M may be selected from among transition metals, R may be selected from among a $C_1$-$C_4$ alkyl group and oxygen (O), and X may be selected from among halogen elements.

M in the above Formulas may be any one selected from among zinc (Zn), copper (Cu), and cobalt (Co).

The above compound may be represented by any one of the following Formulas:

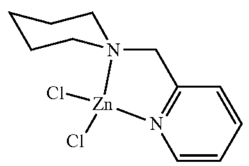

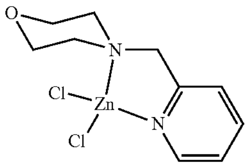

-continued

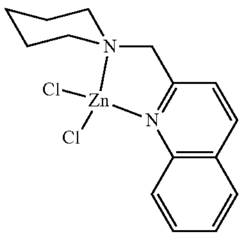
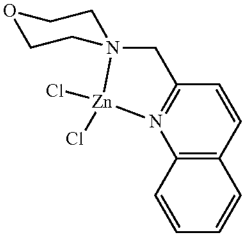
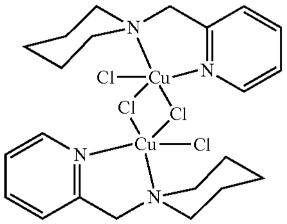
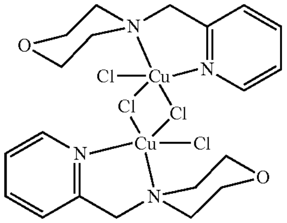
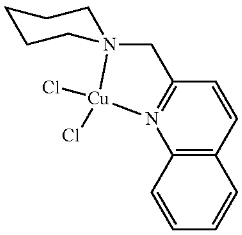
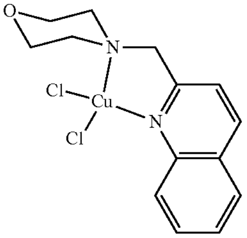
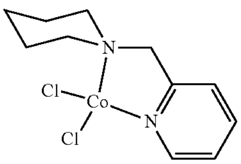
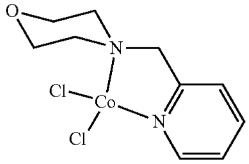
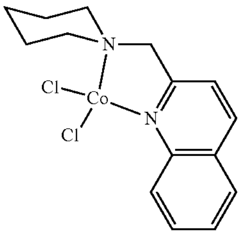
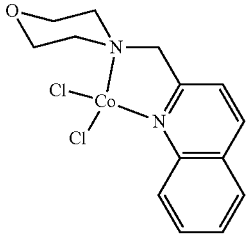

The present invention also provides a catalyst composition for polymerization of a monomer having a cyclic ester group, the catalyst composition comprising the above transition metal compound.

The monomer may be any one or more selected from the group consisting of lactide, glycolide, and F-caprolactone.

The catalyst composition may control heterotacticity ($P_r$) during polymerization of the monomer.

The catalyst composition may further comprise a cocatalyst or an initiator.

The present invention also provides a method for producing a polymer of a monomer having a cyclic ester group, the method comprising steps of: activating the catalyst by mixing the catalyst composition for polymerization of a monomer having a cyclic ester group with an initiator; and polymerizing a monomer having a cyclic ester group by adding the activated catalyst to the monomer.

The step of activating the catalyst may be performed by mixing the catalyst composition and the initiator at a molar ratio of 1:(1 to 3).

The initiator may be any one or more selected from among lithium propan-2-olate (LiOiPr), lithium methanide (LiMe), and phenylmethanol (BnOH).

The step of polymerizing the monomer may be performed by adding the activated catalyst at a ratio of 0.1 to 10 moles based on 100 moles of the monomer.

The step of polymerizing the monomer may be performed at a temperature of 0 to 30° C. for 0.5 to 2 hours.

In the production method, the conversion yield of the monomer to the polymer may be 95% or more.

The polymer of the monomer having a cyclic ester group may have a heterotacticity ($P_r$) of 55% or more.

The transition metal compound according to the present invention is chemically stable in air, and thus may be used as a catalyst composition for polymerization of a monomer having a cyclic ester group.

The catalyst composition comprises a transition metal complex containing aminopyridine and aminoquinoline ligands, and thus is capable of effectively producing a polymer having high heterotacticity ($P_r$) with high conversion rate at room temperature or below room temperature without satisfying high-temperature conditions.

DETAILED DESCRIPTION

Figure 1:
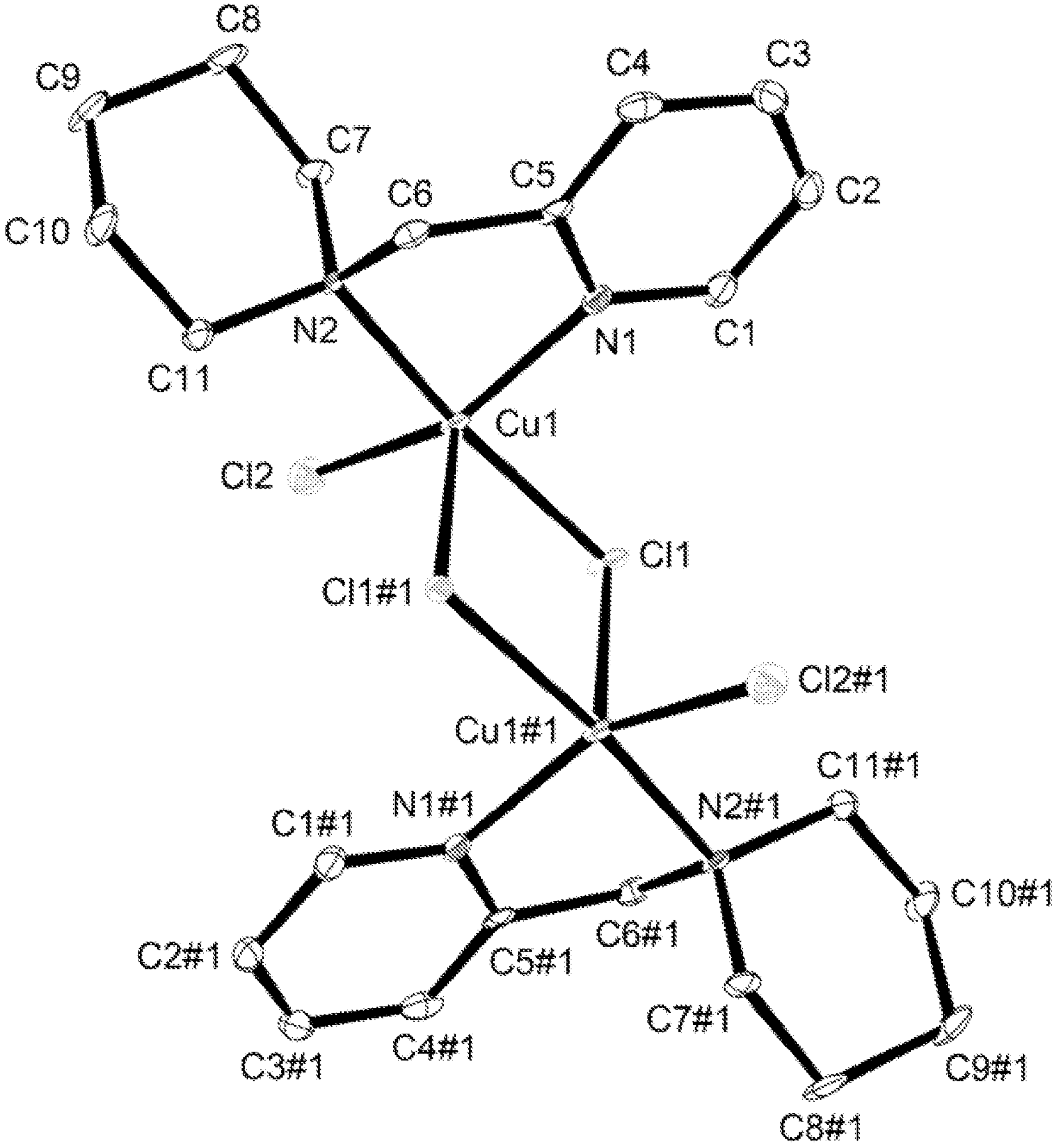
FIG. 1 shows the crystal structure of the copper complex $[L_1Cu(\mu\text{-}Cl)Cl]_2$ produced according to Example 3-1 of the present invention.

Hereinafter, the present invention will be described in detail.

The present inventors have synthesized a transition metal complex containing aminopyridine and aminoquinoline ligands, and have found that, when the transition metal complex is used, a polylactide having high heterotacticity ($P_r$) may be produced with high conversion rate even at room temperature, thereby completing the present invention.

The present invention provides a transition metal compound represented by Formula 1 or 2 below:

[Formula 1]

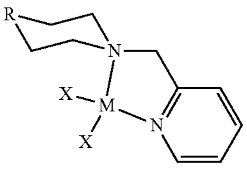

[Formula 2]

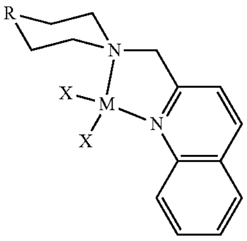

wherein M may be selected from among transition metals, R may be selected from among a $C_1$-$C_4$ alkyl group and oxygen (O), and X may be selected from among halogen elements.

Preferably, M may be any one selected from among zinc (Zn), copper (Cu), and cobalt (Co), without being limited thereto.

Preferably, R may be selected from among a $C_1$-$C_4$ alkyl group and oxygen, without being limited thereto.

Preferably, X may be selected from among Cl and Br, without being limited thereto.

The compound represented by Formula 1 may be formed as a dimer represented by Formula 3 below:

[Formula 3]

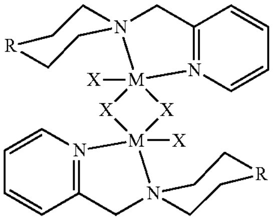

wherein M may be selected from among transition metals, R may be selected from among a $C_1$-$C_4$ alkyl group and oxygen (O), and X may be selected from among halogen elements.

For corresponding features, reference may be made to the foregoing.

More specifically, the compound represented by Formula 1 or 2 may be represented by any one of the following Formulas:

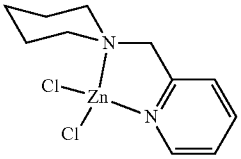

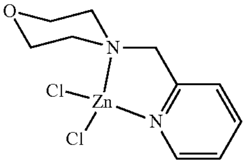

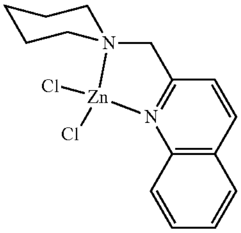

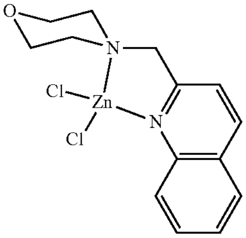

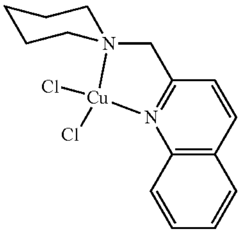

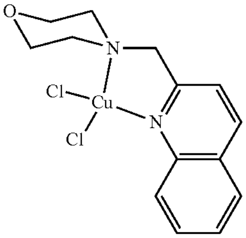

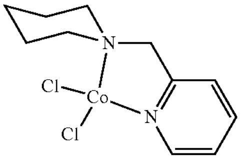

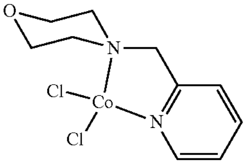

-continued

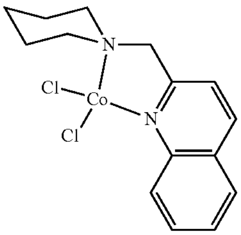

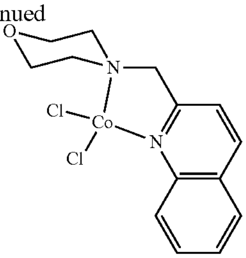

The compound represented by Formula 3 may be represented by any one of the following Formulas:

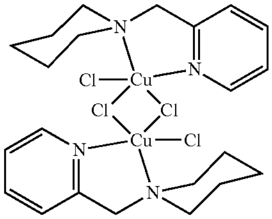

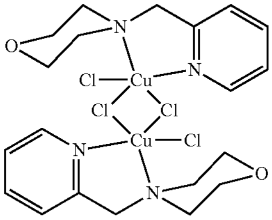

The present invention also provides a catalyst composition for polymerization of a monomer having a cyclic ester group, the catalyst composition comprising the above transition metal compound.

The catalyst composition comprises a transition metal complex containing aminopyridine and aminoquinoline ligands, and the ligands determine the catalytic efficiency of the organometallic complex in a ring-opening polymerization reaction, and thus are an important element to obtain optimal catalytic performance of the metal complex.

The monomer may be any one or more selected from the group consisting of lactide, glycolide, and F-caprolactone, preferably lactide, without being limited thereto.

The catalyst composition may further comprise an initiator or a cocatalyst.

The initiator may be one or more selected from among LiOiPr, LiMe, and BnOH, without being limited thereto.

The catalyst composition may control heterotacticity ($P_r$) during polymerization of the monomer.

The present invention also provides a method of producing a polymer of a monomer having a cyclic ester group using the catalyst composition for polymerization of a monomer having a cyclic ester group.

The method of producing a polymer of a monomer having a cyclic ester group comprises steps of: activating the catalyst by mixing the catalyst composition for polymerization of a monomer having a cyclic ester group with an initiator or a cocatalyst; and polymerizing a monomer having a cyclic ester group by adding the activated catalyst to the monomer.

In the production method according to the present invention, the step of activating the catalyst may be performed by mixing the catalyst composition and the initiator at a molar ratio of 1:(1 to 3), preferably 1:2.

The catalyst composition may be mixed with the initiator after dissolving the transition metal compound in an organic solvent.

The organic solvent may be tetrahydrofuran, without being limited thereto.

The initiator may be any one or more selected from among LiOiPr, LiMe, and BnOH, without being limited thereto.

In the production method according to the present invention, the step of polymerizing the monomer may be performed by adding the activated catalyst at a ratio of 0.1 to 10 moles based on 100 moles of the monomer.

The monomer may be any one or more selected from the group consisting of lactide, glycolide, and F-caprolactone, and may be used after being dissolved in an organic solvent.

The organic solvent may be methylene chloride ($CH_2Cl_2$), without being limited thereto.

The step of polymerizing the monomer may be performed at a temperature of 0 to 30° C., that is, room temperature, for 0.5 to 2 hours.

In the production method, the conversion yield of the monomer to the polymer may be 95% or more even at room temperature rather than under high-temperature conditions.

The polymer of the monomer having a cyclic ester group may have a heterotacticity ($P_r$) of 55% or more.

The present invention also provides a polymer (specifically polylactide) of a monomer having a cyclic ester group, produced according to the above production method.

Hereinafter, the present invention will be described in detail with reference to examples in order to assist in the understanding of the present invention. However, the following examples are merely illustrative of the content of the present invention, but the scope of the present invention is not limited to the following examples. The following examples of the present invention are provided to more completely explain the present invention to those skilled in the art.

<Example 1> Production of Aminopyridine and Aminoquinoline Ligands

Example 1-1: Production of 2-(piperidin-1-ylmethyl) pyridine, Ligand 1 [$L_1$]

The 2-(piperidin-1-ylmethyl)pyridine ligand was produced in the following manner with reference to "Chem. Eur. J. 2021, 27, 14826."

First, 4.29 g (30.0 mmol) of 2-(chloromethyl)pyridine hexahydrate was dissolved in 50 mL of distilled water, and then 2.55 g (30.0 mmol) of piperidine was added thereto, and KOH 3.37 g (60.0 mmol) was slowly added, followed by reaction at room temperature for 24 hours. The resulting ligand was extracted with 50 mL of methylene chloride, and then the remaining water was removed with $MgSO_4$ and filtered. The filtered solvent was removed by drying under reduced pressure, and the remaining reaction mixture was distilled under reduced pressure to obtain the title compound as a colorless liquid. The yield of the obtained compound was 3.35 g (63.4%).

Example 1-2: Production of 4-(pyridin-2-ylmethyl) morpholine, Ligand 2 [$L_2$]

The 4-(pyridin-2-ylmethyl)morpholine ligand was produced in the following manner with reference to "Eur. J. Inorg. Chem. 2020, 2506."

First, 3.28 g (20.0 mmol) of 2-(chloromethyl)pyridine hexahydrate was added to 50 mL of distilled water, and 2.24 g (40.0 mmol) of KOH was slowly added thereto, followed by reaction at room temperature for 24 hours. The resulting ligand was extracted with 50 mL of methylene chloride, and then the remaining water was removed with $MgSO_4$ and filtered. The filtered solvent was removed by drying under reduced pressure, and the remaining reaction mixture was distilled under reduced pressure to obtain the title compound as a colorless liquid. The yield of the obtained compound was 2.07 g (58.0%).

Example 1-3: Production of 2-(piperidin-1-ylmethyl) quinoline, Ligand 3 [$L_3$]

The 2-(piperidin-1-ylmethyl)quinoline ligand was produced in the following manner with reference to "Tetrahedron Letters 2018, 59, 1723."

First, 4.28 g (20.0 mmol) of 2-(chloromethyl)quinoline hexahydrate was dissolved in 50 mL of distilled water, and then 1.70 g (20.0 mmol) of piperidine was added thereto, and 2.24 g (40.0 mmol) of KOH was slowly added thereto, followed by reaction at room temperature for 24 hours. The resulting ligand was extracted with 50 mL of methylene chloride, and then the remaining water was removed with $MgSO_4$ and filtered. The filtered solvent was removed by drying under reduced pressure, and the remaining reaction mixture was distilled under reduced pressure to obtain the title compound as a fluorescent yellow highly viscous liquid. The yield of the obtained compound was 2.63 g (58.0%).

Example 1-4: Production of 4-(quinolin-2-ylmethyl) morpholine, Ligand 4 [$L_4$]

The 4-(quinolin-2-ylmethyl)morpholine ligand was produced in the following manner with reference to "Tetrahedron Letters 2018, 59, 1723."

First, 4.67 g (21.8 mmol) of 2-(chloromethyl)quinoline hexahydrate was dissolved in 50 mL of distilled water, and then 1.90 g (21.8 mmol) of morpholine was added thereto, and 2.45 g (43.6 mmol) of KOH was slowly added thereto, followed by reaction for 24 hours at room temperature. The resulting ligand was extracted with 50 mL of methylene chloride, and then the remaining water was removed with $MgSO_4$ and filtered. The filtered solvent was removed by drying under reduced pressure, and the remaining reaction mixture was distilled under reduced pressure to obtain the title compound as a fluorescent yellow highly viscous liquid. The yield of the obtained compound was 2.84 g (57.0%).

<Example 2> Production of Catalysts—Zinc Complexes

Example 2-1: Production of [$L_1ZnCl_2$]

A solution of ligand [$L_1$] (0.353 g, 2.00 mmol) in 10 mL of ethanol and a solution of $ZnCl_2$ (0.273 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a white solid. The yield of the obtained compound was 0.505 g (81%), and the compound is represented by Formula 1 below:

[Formula 1]

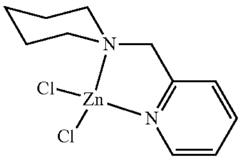

$^{1}H$ NMR (500 MHz; $CDCl_3$): δ 8.71 (1H, d, J=5.10 Hz, pyridine-H), 8.00 (1H, t, J=7.65 Hz, pyridine-H), 7.57 (1H, t, J=6.52 Hz, pyridine-H), 7.43 (1H, d, J=7.65 Hz, pyridine-H), 3.95 (2H, s, $N_{Piperidine}$—$CH_2$-pyridine), 3.33 (2H, d, J=10.77 Hz, piperidine-H), 2.37 (2H, t, J=11.91 Hz, piperidine-H), 2.18 (2H, m, J=12.47 Hz, piperidine-H), 1.90 (1H, m, J=13.32 Hz, piperidine-H), 1.78 (2H, d, J=14.46 Hz, piperidine-H), 1.34 (1H, m, J=13.04 Hz, piperidine-H).

$^{13}C$ NMR (125 MHz; $CDCl_3$): δ 153.81 (1C, pyridine-C), 148.58 (1C, pyridine-C), 140.95 (1C, pyridine-C), 125.14 (1C, pyridine-C), 123.85 (1C, pyridine-C), 63.22 (1C, $N_{Piperidine}$—$CH_2$-pyridine) 56.06 (2C, piperidine-C), 24.68 (2C, piperidine-C), 22.90 (1C, piperidine-C).

Analysis calculated for $C_{11}H_{16}Cl_2N_2Zn$: C, 45.3% H, 5.16% N, 8.96%. Found: C, 42.2% H, 5.22% N, 9.11%.

FT-IR (solid (neat); $cm^{-1}$): v($sp^3$ C—H) 2852 w; $v(C{=}N)_{py}$ 1605 m; $v(C{=}C)_{py}$ 1479 w; δ($sp^3$ C—H) 1445 m; v(C—N) 1296 m; δ($sp^2$ C—H) 763 s; v(M-N) 650 w.

Example 2-2: Production of $[L_2ZnCl_2]$

A solution of ligand $[L_2]$ (0.356 g, 2.00 mmol) in 10 mL of ethanol and a solution of $ZnCl_2$ (0.273 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a white solid. The yield of the obtained compound was 0.570 g (91%), and the compound is represented by Formula 2 below:

[Formula 2]

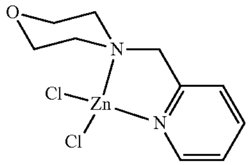

$^{1}H$ NMR (500 MHz; $CDCl_3$): δ 8.69 (1H, d, J=5.18 Hz, pyridine-H), 8.05 (1H, t, J=7.65 Hz, pyridine-H), 7.61 (1H, t, J=6.75 Hz, pyridine-H), 7.52 (1H, d, J=7.88 Hz, pyridine-H), 4.16 (2H, t, J=11.26 Hz, morpholine-H), 4.01 (2H, s, $N_{Morpholine}$—$CH_2$-pyridine), 3.91 (2H, d, J=12.61 Hz, morpholine-H), 3.20 (2H, d, J=12.16 Hz, morpholine-H), 2.67 (2H, t, J=11.71 Hz, morpholine-H).

$^{13}C$ NMR (125 MHz; $CDCl_3$): δ 152.95 (1C, pyridine-C), 148.75 (1C, pyridine-C), 141.25 (1C, pyridine-C), 125.50 (1C, pyridine-C), 124.11 (1C, pyridine-C), 65.59 (2C, morpholine-C) 63.19 (1C, $N_{Morpholine}$—$CH_2$-pyridine), 54.63 (2C, morpholine-C).

Analysis calculated for $C_{10}H_{14}Cl_2N_2OZn$: C, 38.2% H, 4.49% N, 8.91%. Found: C, 38.1% H, 4.54% N, 9.17%.

FT-IR (solid (neat); $cm^{-1}$): v($sp^3$ C—H) 2849 w; $v(C{=}N)_{py}$ 1606 m; $v(C{=}C)_{py}$ 1442 m; δ($sp^3$ C—H) 1349 m; v(C—N) 1296 m; v(O—C) 1106 m; δ($sp^2$ C—H) 774 s; v(M-N) 650 m.

Example 2-3: Production of $[L_3ZnCl_2]$

A solution of ligand $[L_3]$ (0.453 g, 2.00 mmol) in 10 mL of ethanol and a solution of $ZnCl_2$ (0.273 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a white solid. The yield of the obtained compound was 0.683 g (88%), and the compound is represented by Formula 3 below:

[Formula 3]

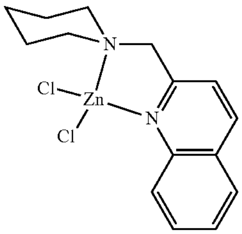

$^{1}H$ NMR (500 MHz; $CDCl_3$): δ 8.76 (1H, d, J=9.68 Hz, quinoline-H), 8.46 (1H, d, J=8.19 Hz, quinoline-H), 7.94 (2H, d, J=6.70 Hz, quinoline-H), 7.72 (1H, t, J=7.45 Hz, quinoline-H), 7.45 (1H, d, J=8.19 Hz, quinoline-H), 4.15 (2H, s, $N_{Piperidine}$—$CH_2$-quinoline), 3.46 (2H, d, J=11.17 Hz, piperidine-H), 2.47 (2H, t, J=12.02 Hz, piperidine-H), 2.32 (2H, m, J=12.30 Hz, piperidine-H), 1.92 (1H, m, J=13.70 Hz, piperidine-H), 1.79 (2H, d, J=14.54 Hz, piperidine-H), 1.38 (1H, m, J=12.86 Hz, piperidine-H).

$^{13}C$ NMR (125 MHz; $CDCl_3$): δ 155.47 (1C, quinoline-C), 144.99 (1C, quinoline-C), 141.60 (1C, quinoline-C), 132.78 (1C, quinoline-C), 128.47 (2C, quinoline-C), 128.03 (1C, quinoline-C), 127.05 (1C, quinoline-C), 120.10 (1C, quinoline-C), 64.17 (1C, $N_{Piperidine}$—$CH_2$-quinoline), 56.49 (2C, piperidine-C), 24.33 (2C, piperidine-C), 22.93 (1C, piperidine-C).

Analysis calculated for $C_{15}H_{18}Cl_2N_2Zn$: C, 49.7% H, 5.06% N, 7.73%. Found: C, 49.7% H, 5.00% N, 7.89%.

FT-IR (solid (neat); $cm^{-1}$): v($sp^3$ C—H) 2856 m; $v(C{=}N)_{qui}$ 1601 m; $v(C{=}C)_{qui}$ 1512 m; δ($sp^3$ C—H) 1452 m; v(C—N) 1311 m; δ($sp^2$ C—H) 784 s; v(M-N) 639 m.

Example 2-4: Production of $[L_4ZnCl_2]$

A solution of ligand $[L_4]$ (0.457 g, 2.00 mmol) in 10 mL of ethanol and a solution of $ZnCl_2$ (0.273 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a white solid. The yield of the obtained compound was 0.696 g (95%), and the compound is represented by Formula 4 below:

[Formula 4]

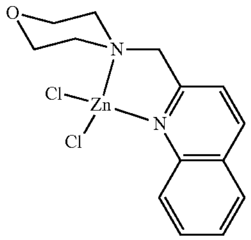

$^1$H NMR (500 MHz; $CDCl_3$): δ 8.71 (1H, d, J=9.47 Hz, quinoline-H), 8.50 (1H, d, J=8.16 Hz, quinoline-H), 7.96 (2H, t, d, J=7.87 Hz, quinoline-H), 7.75 (1H, t, J=7.57 Hz, quinoline-H), 7.49 (1H, d, J=8.30 Hz, quinoline-H), 4.35 (2H, t, J=11.22 Hz, morpholine-H), 4.20 (2H, s, $N_{Morpholine}$—$CH_2$-quinoline), 3.93 (2H, d, J=12.82 Hz, morpholine-H), 3.37 (2H, d, J=11.22 Hz, morpholine-H), 2.75 (2H, t, J=11.80 Hz, morpholine-H).

$^{13}$C NMR (125 MHz; $CDCl_3$): δ 154.56 (1C, quinoline-C), 145.00 (1C, quinoline-C), 141.90 (1C, quinoline-C), 133.14 (1C, quinoline-C), 128.80 (1C, quinoline-C), 128.58 (1C, quinoline-C), 128.12 (1C, quinoline-C), 127.05 (1C, quinoline-C), 120.01 (1C, quinoline-C), 65.38 (2C, morpholine-C), 64.36 (1C, $N_{Morpholine}$—$CH_2$-Quinoline), 55.13 (2C, morpholine-C).

Analysis calculated for $C_{14}H_{16}Cl_2N_2OZn$: C, 46.1% H, 4.42% N, 7.68%. Found: C, 46.1% H, 4.37% N, 7.86%.

FT-IR (solid (neat); $cm^{-1}$): v($sp^3$ C—H) 2853 w; $v(C{=}N)_{qui}$ 1602 m; $v(C{=}C)_{qui}$ 1514 m; δ($sp^3$ C—H) 1461 m; v(C—N) 1438 m; v(O—C) 1104 s; δ($sp^2$ C—H) 756 s; v(M-N) 638 m.

<Example 3> Production of Catalysts—Copper Complexes

Example 3-1: Production of $[L_1Cu(\mu\text{-}Cl)Cl]_2$

A solution of ligand $[L_1]$ (0.353 g, 2.00 mmol) in 10 mL of ethanol and a solution of $CuCl_2{\cdot}2H_2O$ (0.341 g, 2.00 mmol) in 10 mL of ethanol were mixed together, followed by reaction at room temperature for 6 hours. The reaction solvent was removed by vacuum drying, and the residue was washed 3 times with 10 mL of cold ethanol and then washed 3 times with 10 mL of diethyl ether to obtain the title compound as a green solid. The yield of the obtained compound was 0.589 g (95%), and the compound is represented by Formula 5 below:

[Formula 5]

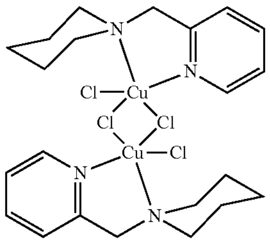

Analysis calculated for $C_{22}H_{32}Cl_4Cu_2N_4$: C, 42.5% H, 5.19% N, 9.02%. Found: C, 42.5% H, 5.39% N, 8.87%.

FT-IR (solid (neat); $cm^{-1}$): v($sp^3$ C—H) 2861 w; $v(C{=}N)_{py}$ 1606 m; $v(C{=}C)_{py}$ 1481 m; δ($sp^3$ C—H) 1451 m; v(C—N) 1306 m; δ($sp^2$ C—H) 785 s; v(M-N) 634 w.

FIG. 1 shows the crystal structure of the copper complex $[L_1Cu(\mu\text{-}Cl)Cl]_2$ produced according to Example 3-1, details of which are shown in Tables 1 and 2 below.

TABLE 1

| | $[L1Cu(\mu\text{-}Cl)Cl]_2$ |
|---|---|
| Empirical formula | $C_{22}H_{32}Cl_4C2N_4$ |
| Formula weight | 621.39 |
| Temperature (K) | 150(2) |
| Wavelength (Å) | 0.630 |
| Crystal system | Monoclinic |
| Space group | P2(1)/c |
| Unit cell dimensions | |
| a (Å) | 10.682(2) |
| b (Å) | 7.1300(1) |
| c (Å) | 16.493(3) |
| α (°) | 90 |
| β (°) | 100.03(3) |
| γ (°) | 90 |
| Volume (Å$^3$), Z | 1236.9(4), 2 |
| Density (calculated) (Mg/m$^3$) | 1.668 |
| Absorption coefficient (mm$^{-1}$) | 1.553 |
| F(000) | 636 |
| Crystal size (mm$^3$) | 0.075 × 0.035 × 0.015 |
| Theta range for data collection | 1.716 to 25.999° |
| Index ranges | $-14 \le h \le 14$, $-9 \le k \le 9$, $-22 \le l \le 22$ |
| Reflections collected | 12134 |
| Independent reflections | 3481 [R(int) = 0.0996] |
| Completeness to theta | 100.0% (22.210°) |
| Absorption correction | Empirical |
| Refinement method | Full-matrix least-squares on F$^2$ |
| Data/restraints/parameters | 3481/0/145 |
| Goodness-of-fit on F$^2$ | 0.967 |
| Final R indices [I > 2sigma(I)] | $R_1$ = 0.0415, $wR_2$ = 0.0975 |
| R indices (all data) | $R_1$ = 0.0576, $wR_2$ = 0.1016 |
| Largest diff. peak and hole (e ·Å$^{-3}$) | 1.012 and −1.030 |

TABLE 2

| $[L1Cu(\mu\text{-}Cl)Cl]_2$ | |
|---|---|
| Bond lengths (Å) | |
| Cu(1)—N(1) | 2.029(2) |
| Cu(1)—N(2) | 2.090(2) |
| Cu(1)—Cl(2) | 2.2541(9) |
| Cu(1)—Cl(1) | 2.3079(8) |
| Cu(1)—Cl(1)#1 | 2.6168(8) |
| N(2)—C(6) | 1.487(3) |
| Bond angles (°) | |
| N(1)—Cu(1)—N(2) | 80.64(9) |
| N(1)—Cu(1)—Cl(2) | 152.05(7) |
| N(2)—Cu(1)—Cl(2) | 93.46(6) |
| N(1)—Cu(1)—Cl(1) | 91.69(7) |
| N(2)—Cu(1)—Cl(1) | 171.86(6) |
| Cl(2)—Cu(1)—Cl(1) | 94.60(3) |
| N(1)—Cu(1)—Cl(1)#1 | 97.95(7) |
| N(2)—Cu(1)—Cl(1)#1 | 92.01(6) |
| Cl(2)—Cu(1)—Cl(1)#1 | 109.61(3) |
| Cl(1)—Cu(1)—Cl(1)#1 | 86.33(3) |

Example 3-2: Production of $[L_2Cu(\mu\text{-}Cl)Cl]_2$

A solution of ligand $[L_2]$ (0.357 g, 2.00 mmol) in 10 mL of ethanol and a solution of $CuCl_2{\cdot}2H_2O$ (0.341 g, 2.00 mmol) in 10 mL of ethanol were mixed together, followed by reaction at room temperature for 6 hours. The reaction solvent was removed by vacuum drying, and the residue was washed 3 times with 10 mL of cold ethanol and then washed 3 times with 10 mL of diethyl ether to obtain the title compound as a green solid. The yield of the obtained compound was 0.598 g (96%), and the compound is represented by Formula 6 below:

[Formula 6]

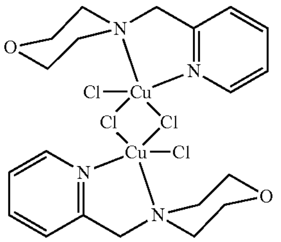

Analysis calculated for $C_{20}H_{28}Cl_4Cu_2N_4O_2$: C, 38.4% H, 4.51% N, 8.96%. Found: C, 38.9% H, 4.55% N, 8.95%.

FT-IR (solid (neat); $cm^{-1}$): ν($sp^3$ C—H) 2836 w; ν(C═N)$_{py}$ 1606 m; ν(C═C)$_{py}$ 1481 m; δ($sp^3$ C—H) 1447 m; ν(C—N) 1301 w; ν(O—C) 1107 s; δ($sp^2$ C—H) 776 s; ν(M-N) 650 w.

Example 3-3: Production of [$L_3CuCl_2$]

A solution of ligand [$L_3$] (0.453 g, 2.00 mmol) in 10 mL of ethanol and a solution of $CuCl_2·2H_2O$ (0.341 g, 2.00 mmol) in 10 mL of ethanol were mixed together, followed by reaction at room temperature for 6 hours. The reaction solvent was removed by vacuum drying, and the residue was washed 3 times with 10 mL of cold ethanol and then washed 3 times with 10 mL of diethyl ether to obtain the title compound as a green solid. The yield of the obtained compound was 0.710 g (97%), and the compound is represented by Formula 7 below:

[Formula 7]

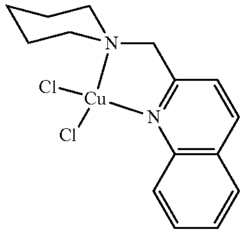

Analysis calculated for $C_{15}H_{18}Cl_2CuN_2$: C, 49.9% H, 5.03% N, 7.76%. Found: C, 49.9H, 5.04% N, 7.73%.

FT-IR (solid (neat); $cm^{-1}$): ν($sp^3$ C—H) 2865 w; ν(C═N)$_{qui}$ 1599 w; ν(C═C)$_{qui}$ 1513 m; δ($sp^3$ C—H) 1434 m; ν(C—N) 1311 w; δ($sp^2$ C—H) 781 s; ν(M-N) 637 m.

Example 3-4: Production of [$L_4CuCl_2$]

A solution of ligand [$L_4$] (0.457 g, 2.00 mmol) in 10 mL of ethanol and a solution of $CuCl_2·2H_2O$ (0.341 g, 2.00 mmol) in 10 mL of ethanol were mixed together, followed by reacted at room temperature for 6 hours. The reaction solvent was removed by vacuum drying, and the residue was washed 3 times with 10 mL of cold ethanol and then washed 3 times with 10 mL of diethyl ether to obtain the title compound as a green solid. The yield of the obtained compound was 0.697 g (96%), and the compound is represented by Formula 8 below:

[Formula 8]

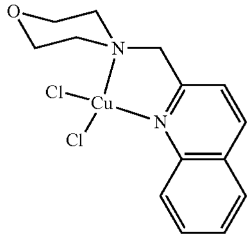

Analysis calculated for $C_{14}H_{16}Cl_2CuN_2O$: C, 46.4% H, 4.45% N, 7.72%. Found: C, 46.3% H, 4.41% N, 7.96%.

FT-IR (solid (neat); $cm^{-1}$): ν($sp^3$ C—H) 2831 w; ν(C═N)$_{qui}$ 1599 w; ν(C═C)$_{qui}$ 1513 m; δ($sp^3$ C—H) 1439 m; ν(C—N) 1307 w; ν(O—C) 1107 s; δ($sp^2$ C—H) 781 s; ν(M-N) 652 m.

<Example 4> Production of Catalysts—Cobalt Complexes

Example 4-1: Production of [$L_1CoCl_2$]

A solution of ligand [$L_1$] (0.353 g, 2.00 mmol) in 10 mL of ethanol and a solution of $COCl_2·6H_2O$ (0.476 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a blue solid. The yield of the obtained compound was 0.437 g (71%), and the compound is represented by Formula 9 below:

[Formula 9]

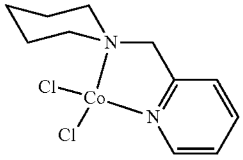

Analysis calculated for $C_{11}H_{16}Cl_2CoN_2$: C, 43.2% H, 5.27% N, 9.15%. Found: C, 43.4% H, 5.27% N, 9.61%.

FT-IR (solid (neat); $cm^{-1}$): ν($sp^3$ C—H) 2854 w; ν(C═N)$_{py}$ 1606 m; ν(C═C)$_{py}$ 1477 w; δ($sp^3$ C—H) 1446 m; ν(C—N) 1295 m; δ($sp^2$ C—H) 765 s; ν(M-N) 652 w.

Example 4-2: Production of [$L_2CoCl_2$]

A solution of ligand [$L_2$] (0.357 g, 2.00 mmol) in 10 mL of ethanol and a solution of CoCl2·$6H_2O$ (0.476 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a blue solid. The yield of the obtained compound was 0.418 g (68%), and the compound is represented by Formula 10 below:

[Formula 10]

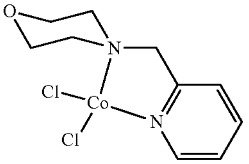

Analysis calculated for $C_{10}H_{14}Cl_2CoN_2O$: C, 39.0% H, 4.58% N, 9.09%. Found: C, 39.2% H, 4.57% N, 9.39%.

FT-IR (solid (neat); $cm^1$): v($sp^3$ C—H) 2849 w; v(C═N)$_{py}$ 1606 m; v(C═C)$_{py}$ 1470 w; δ($sp^3$ C—H) 1441 m; v(C—N) 1294 m; v(O—C) 1108 s; δ($sp^2$ C—H) 774 s; v(M-N) 654 w.

Example 4-3: Production of [$L_3CoCl_2$]

A solution of ligand [$L_3$] (0.453 g, 2.00 mmol) in 10 mL of ethanol and a solution of $CoCl_2 \cdot 6H_2O$ (0.476 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a blue solid. The yield of the obtained compound was 0.689 g (97%), and the compound is represented by Formula 11 below:

[Formula 11]

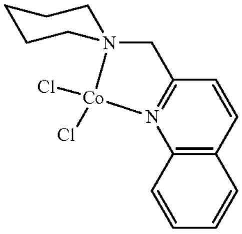

Analysis calculated for $C_{15}H_{18}Cl_2CoN_2$: C, 50.6% H, 5.09% N, 7.87%. Found: C, 50.7% H, 5.13% N, 8.01%.

FT-IR (solid (neat); $cm^{-1}$): v($sp^3$ C—H) 2855 w; v(C═N)$_{qui}$ 1601 m; v(C═C)$_{qui}$ 1512 m; δ($sp^3$ C—H) 1451 m; v(C—N) 1309 m; δ($sp^2$ C—H) 783 s; v(M-N) 642 m.

Figure 2:
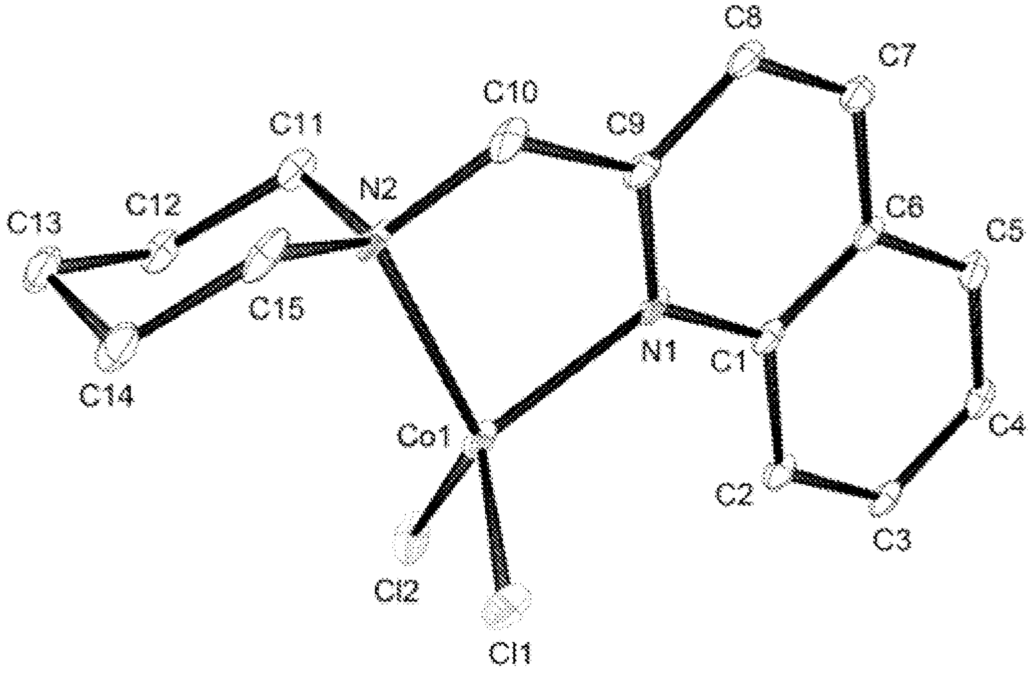
FIG. 2 shows the crystal structure of the cobalt complex $[L_3CoCl_2]$ produced according to Example 4-3 of the present invention.

FIG. 2 shows the crystal structure of the cobalt complex [$L_3CoCl_2$] produced according to Example 4-3, details of which are shown in Tables 3 and 4 below.

TABLE 3

| | [$L_3CoCl_2$] |
|---|---|
| Empirical formula | $C_{15}H_{18}Cl_2CoN_2$ |
| Formula weight | 356.14 |
| Temperature (K) | 100(2) |
| Wavelength (Å) | 0.630 |
| Crystal system | Monoclinic |
| Space group | P2(1)/c |
| Unit cell dimensions | |
| a (Å) | 16.445(3) |
| b (Å) | 12.667(3) |
| c (Å) | 7.4670(2) |
| α (°) | 90 |
| β (°) | 97.23(3) |
| γ (°) | 90 |
| Volume ($Å^3$), Z | 1543.1(5), 4 |
| Density (calculated) ($Mg/m^3$) | 1.533 |
| Absorption coefficient ($mm^{-1}$) | 1.034 |
| F (000) | 732 |
| Crystal size ($mm^3$) | 0.08 × 0.02 × 0.015 |
| Theta range for data collection | 1.804 to 25.999° |
| Index ranges | −22 ≤ h ≤ 22<br>−17 ≤ k ≤ 17<br>−10 ≤ l ≤ 10 |
| Reflections collected | 16033 |
| Independent reflections | 4183 [R(int) = 0.0688] |
| Completeness to theta | 97.2% (22.210°) |
| Absorption correction | Empirical |
| Refinement method | Full-matrix least-squares on $F^2$ |
| Data/restraints/parameters | 4183/0/181 |
| Goodness-of-fit on $F^2$ | 0.934 |
| Final R indices [I > 2sigma(I)] | $R_1$ = 0.0393<br>$wR_2$ = 0.0906 |
| R indices (all data) | $R_1$ = 0.0680<br>$wR_2$ = 0.0977 |
| Largest diff. peak and hole (e · $Å^{-3}$) | 0.721 and −0.759 |

TABLE 4

| [$L_3CoCl_2$] | |
|---|---|
| Bond lengths (Å) | |
| Co(1)—N(1) | 2.031(2) |
| Co(1)—N(2) | 2.095(2) |
| Co(1)—Cl(2) | 2.2291(8) |
| Co(1)—Cl(1) | 2.2293(9) |
| N(2)—C(10) | 1.493(3) |
| N(1)—C(9) | 1.328(3) |
| Bond angles (°) | |
| N(1)—Co(1)—N(2) | 84.24(8) |
| N(1)—Co(1)—Cl(2) | 110.44(6) |
| N(2)—Co(1)—Cl(2) | 121.10(6) |
| N(1)—Co(1)—Cl(1) | 114.78(7) |
| N(2)—Co(1)—Cl(1) | 107.21(6) |
| Cl(2)—Co(1)—Cl(1) | 115.42(3) |

Example 4-4: Production of [$L_4CoCl_2$]

A solution of ligand [$L_4$] (0.457 g, 2.00 mmol) in 10 mL of ethanol and a solution of $CoCl_2 \cdot 6H_2O$ (0.476 g, 2.00 mmol) in 10 mL of ethanol were mixed together, followed by reaction at room temperature for 3 hours. The reaction solvent was removed by vacuum drying, and the residue was washed 3 times with 10 mL of cold ethanol and then washed 3 times with 10 mL of diethyl ether to obtain the title compound as a blue solid. The yield of the obtained compound was 0.692 g (97%), and the compound is represented by Formula 12 below:

[Formula 12]

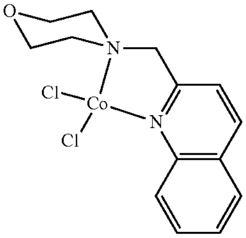

Analysis calculated for $C_{14}H_{16}Cl_2CoN_2O$: C, 47.0% H, 4.50% N, 7.82%. Found: C, 47.3% H, 4.56% N, 7.64%.

FT-IR (solid (neat); $cm^{-1}$): ν($sp^3$ C—H) 2855 w; ν(C═N)$_{qui}$ 1601 m; ν(C═C)$_{qui}$ 1514 m; δ($sp^3$ C—H) 1438 m; ν(C—N) 1309 m; ν(O—C) 1103 s; δ($sp^2$ C—H) 785 s; ν(M-N) 638 m.

<Example 5> Polymer Production

Example 5-1

Under an argon atmosphere, LiOiPr (0.25 mL, 0.50 mmole) as an initiator was added to a solution of the catalyst [$L_1ZnCl_2$] (0.078 g, 0.25 mmole) produced in Example 2-1 in tetrahydrofuran (3.75 mL), followed by stirring for 5 minutes.

Meanwhile, under an argon atmosphere, lactide (0.901 g, 6.25 mmol) was dissolved in methylene chloride (5.0 mL). To measure the conversion yield, tetralin (0.085 mL, 0.625 mmol) as a reference material was introduced into the lactide flask and stirred, and then an NMR sample (0.1 mL) was taken before the start of polymerization. Then, the activated catalyst (1.0 mL) produced as described above was added to the lactide solution, followed by stirring at 25° C. for 1 hour. After 1 hour, an NMR sample (0.1 mL) for measuring the conversion yield was taken from the obtained reaction product. Then, distilled water (1.0 mL) was added to terminate the reaction, and hexane (20.0 mL) was added to precipitate the polymer. The reaction product was dried under vacuum to obtain the polymer, and it was confirmed by NMR that the polymer was obtained with a conversion yield of up to 97%. The obtained polylactide (PLA) had the following properties: $M_w$=10.33 (g/mol)×$10^3$, $M_n$=8.293 (g/mol)×$10^3$, PDI=1.25, $P_r$ (probability of heterotactic enchainment)=0.57, and $T_g$ (glass transition temperature=45.7° C.

Example 5-2

The reaction was performed under the same conditions as those in Example 5-1, except that the catalyst [$L_2ZnCl_2$] (0.079 g, 0.25 mmole) produced in Example 2-2 was used.

It was confirmed by NMR that the polymer was obtained with a conversion yield of up to 98%. The obtained PLA had the following properties: $M_w$=14.50 (g/mol)×$10^3$, $M_n$=11.88 (g/mol)×$10^3$, PDI=1.22, $P_r$=0.67, and $T_g$=47.2° C.

Example 5-3

The reaction was performed under the same conditions as those in Example 5-1, except that the catalyst [$L_3ZnCl_2$] (0.091 g, 0.25 mmole) produced in Example 2-3 was used.

It was confirmed by NMR that the polymer was obtained with a conversion yield of up to 96%. The obtained PLA had the following properties: $M_w$=11.22 (g/mol)×$10^3$, $M_n$=9.187 (g/mol)×$10^3$, PDI=1.22, $P_r$=0.55, and $T_g$=46.6° C.

Example 5-4

The reaction was performed under the same conditions as those in Example 5-1, except that the catalyst [$L_4ZnCl_2$] (0.091 g, 0.25 mmole) produced in Example 2-4 was used.

It was confirmed by NMR that the polymer was obtained with a conversion yield of up to 97%. The obtained PLA had the following properties: $M_w$=10.73 (g/mol)×$10^3$, $M_n$=8.713 (g/mol)×$10^3$, PDI=1.23, $P_r$=0.62, and $T_g$=47.6° C.

Example 5-5

The reaction was performed under the same conditions as those in Example 5-1, except that the catalyst [$L_1$Cu(μ-Cl)Cl]$_2$ (0.078 g, 0.25 mmole) produced in Example 3-1 was used.

It was confirmed by NMR that the polymer was obtained with a conversion yield of up to 97%. The obtained PLA had the following properties: $M_w$=10.06 (g/mol)×$10^3$, $M_n$=8.029 (g/mol)×$10^3$, PDI=1.25, and $P_r$=0.58, $T_g$=46.4° C.

Example 5-6

The reaction was performed under the same conditions as those in Example 5-1, except that the catalyst [$L_2$Cu(μ-Cl)Cl]$_2$ (0.078 g, 0.25 mmole) produced in Example 3-2 was used.

It was confirmed by NMR that the polymer was obtained with a conversion yield of up to 98%. The obtained PLA had the following properties: $M_w$=15.67 (g/mol)×$10^3$, $M_n$=12.63 (g/mol)×$10^3$, PDI=1.24, $P_r$=0.63, and $T_g$=52.0° C.

Example 5-7

The reaction was performed under the same conditions as those in Example 5-1, except that the catalyst [$L_3CuCl_2$] (0.090 g, 0.25 mmole) produced in Example 3-3 was used.

It was confirmed by NMR that the polymer was obtained with a conversion yield of up to 98%. The obtained PLA had the following properties: $M_w$=10.26 (g/mol)×$10^3$, $M_n$=8.191 (g/mol)×$10^3$, PDI=1.25, $P_r$=0.59, AND $T_g$=51.1° C.

Example 5-8

The reaction was performed under the same conditions as those in Example 5-1, except that the catalyst [$L_4CuCl_2$] (0.091 g, 0.25 mmole) produced in Example 3-4 was used.

It was confirmed by NMR that the polymer was obtained with a conversion yield of up to 98%. The obtained PLA had the following properties: $M_w$=15.08 (g/mol)×$10^3$, $M_n$=12.06 (g/mol)×$10^3$, PDI=1.25, $P_r$=0.69, AND $T_g$=49.6° C.

Example 5-9

The reaction was performed under the same conditions as those in Example 5-1, except that the catalyst [$L_1CoCl_2$] (0.077 g, 0.25 mmole) produced in Example 4-1 was used.

It was confirmed by NMR that the polymer was obtained with a conversion yield of up to 97%. The obtained PLA had the following properties: $M_w$=10.27 (g/mol)×$10^3$, $M_n$=8.213 (g/mol)×$10^3$, PDI=1.25, $P_r$=0.59, and $T_g$=47.6° C.

Example 5-10

The reaction was performed under the same conditions as those in Example 5-1, except that the catalyst [$L_2CoCl_2$] (0.077 g, 0.25 mmole) produced in Example 4-2 was used.

It was confirmed by NMR that the polymer was obtained with a conversion yield of up to 97%. The obtained PLA had the following properties: $M_w$=7.198 (g/mol)×$10^3$, $M_n$=5.795 (g/mol)×$10^3$, PDI=1.24, $P_r$=0.58, and $T_g$=45.5° C.

Example 5-11

The reaction was performed under the same conditions as those in Example 5-1, except that the catalyst [$L_3CoCl_2$] (0.089 g, 0.25 mmole) produced in Example 4-3 was used.

It was confirmed by NMR that the polymer was obtained with a conversion yield of up to 95%. The obtained PLA had the following properties: $M_w$=9.687 (g/mol)×$10^3$, $M_n$=7.752 (g/mol)×$10^3$, PDI=1.25, $P_r$=0.58, and $T_g$=47.0° C.

Example 5-12

The reaction was performed under the same conditions as those in Example 5-1, except that the catalyst [$L_4CoCl_2$] (0.090 g, 0.25 mmole) produced in Example 4-4 was used.

It was confirmed by NMR that the polymer was obtained with a conversion yield of up to 97%. The obtained PLA had the following properties: $M_w$=10.24 (g/mol)×$10^3$, $M_1$=8.342 (g/mol)×$10^3$, PDI=1.23 $P_r$=0.58, and $T_g$=46.4° C.

Table 5 below shows the results of the polymerization reactions performed according to Example 5.

TABLE 5

| Example | Catalyst | T (° C.) | Conv. (%) | $M_n$ (g/mol) ×$10^3$ (GPC) | $M_w$ (g/mol) ×$10^3$ (GPC) | PDI | $P_r$ |
|---|---|---|---|---|---|---|---|
| 5-1 | [$L1ZnCl_2$] | 45.7 | 96.7 | 8.293 | 10.33 | 1.25 | 0.57 |
| 5-2 | [$L2ZnCl_2$] | 47.2 | 98.1 | 11.88 | 14.50 | 1.22 | 0.67 |
| 5-3 | [$L3ZnCl_2$] | 46.6 | 96.4 | 9.187 | 11.22 | 1.22 | 0.55 |
| 5-4 | [$L4ZnCl_2$] | 47.6 | 97.3 | 8.713 | 10.73 | 1.23 | 0.62 |
| 5-5 | [L1Cu(μ-Cl)Cl]$_2$ | 46.4 | 97.2 | 8.029 | 10.06 | 1.25 | 0.58 |
| 5-6 | [L2Cu(μ-Cl)Cl]$_2$ | 52.0 | 98.0 | 12.63 | 15.67 | 1.24 | 0.63 |
| 5-7 | [$L3CuCl_2$] | 51.1 | 98.2 | 8.191 | 10.26 | 1.25 | 0.59 |
| 5-8 | [$L4CuCl_2$] | 49.6 | 97.6 | 12.06 | 15.08 | 1.25 | 0.69 |
| 5-9 | [$L1CoCl_2$] | 47.6 | 97.0 | 8.213 | 10.27 | 1.25 | 0.59 |
| 5-10 | [$L2CoCl_2$] | 45.5 | 96.7 | 5.795 | 7.198 | 1.24 | 0.58 |
| 5-11 | [$L3CoCl_2$] | 47.0 | 95.2 | 7.752 | 9.687 | 1.25 | 0.58 |
| 5-12 | [$L4CoCl_2$] | 46.4 | 97.1 | 8.342 | 10.24 | 1.23 | 0.58 |

* Conditions: [catalyst] = 0.0625 mmol, [rac-LA]:[catalyst]:[initiator] = 100:1:2, solvent ($CH_2Cl_2$) 5 mL, initiator = LiOiPr, polymerization = 1 hour, and temperature = 25° C.

<Example 6> Polymer Production—Changed Reaction Temperature

Example 6-1

The reaction was performed under the same conditions as those in Example 5-1, except that the catalyst [$L_1ZnCl_2$] (0.078 g, 0.25 mmole) produced in Example 2-1 was used and the reaction temperature was changed to 0° C.

It was confirmed by NMR that the polymer was obtained with a conversion yield of up to 98%. The obtained PLA had the following properties: $M_w$=11.55 (g/mol)×$10^3$, $M_n$=9.237 (g/mol)×$10^3$, PDI=1.25, $P_r$=0.69, and $T_g$=47.7° C.

Example 6-2

The reaction was performed under the same conditions as those in Example 5-1, except that the catalyst [$L_2ZnCl_2$] (0.079 g, 0.25 mmole) produced in Example 2-2 was used and the reaction temperature was changed to 0° C.

It was confirmed by NMR that the polymer was obtained with a conversion yield of up to 98%. The obtained PLA had the following properties: $M_w$=11.86 (g/mol)×$10^3$, $M_n$=9.786 (g/mol)×$10^3$, PDI=1.21, $P_r$=0.74, and $T_g$=47.8° C.

Example 6-3

The reaction was performed under the same conditions as those in Example 5-1, except that the catalyst [$L_3ZnCl_2$] (0.091 g, 0.25 mmole) produced in Example 2-3 was used and the reaction temperature was changed to 0° C.

It was confirmed by NMR that the polymer was obtained with a conversion yield of up to 97%. The obtained PLA had the following properties: $M_w$=12.31 (g/mol)×$10^3$, $M_n$=10.02 (g/mol)×$10^3$, PDI=1.23, $P_r$=0.68, and $T_g$=48.4° C.

Example 6-4

The reaction was performed under the same conditions as those in Example 5-1, except that the catalyst [$L_4ZnCl_2$] (0.091 g, 0.25 mmole) produced in Example 2-4 was used and the reaction temperature was changed to 0° C.

It was confirmed by NMR that the polymer was obtained with a conversion yield of up to 97%. The obtained PLA had the following properties: $M_w$=9.766 (g/mol)×$10^3$, $M_n$=8.044 (g/mol)×$10^3$, PDI=1.21, $P_r$=0.70, and $T_g$=47.4° C.

Example 6-5

The reaction was performed under the same conditions as those in Example 5-1, except that the catalyst [$L_1$Cu(μ-Cl)Cl]$_2$ (0.078 g, 0.25 mmole) produced in Example 3-1 was used and the reaction temperature was changed to 0° C.

It was confirmed by NMR that the polymer was obtained with a conversion yield of up to 98%. The obtained PLA had the following properties: $M_w$=12.32 (g/mol)×$10^3$, $M_n$=9.895 (g/mol)×$10^3$, PDI=1.25, $P_r$=0.70, and $T_g$=49.8° C.

Example 6-6

The reaction was performed under the same conditions as those in Example 5-1, except that the catalyst [$L_2$Cu(μ-Cl)Cl]$_2$ (0.078 g, 0.25 mmole) produced in Example 3-2 was used and the reaction temperature was changed to 0° C.

It was confirmed by NMR that the polymer was obtained with a conversion yield of up to 98%. The obtained PLA had the following properties: $M_w$=17.68 (g/mol)×$10^3$, $M_n$=14.30 (g/mol)×$10^3$, PDI=1.24, $P_r$=0.75, and $T_g$=51.9° C.

Example 6-7

The reaction was performed under the same conditions as those in Example 5-1, except that the catalyst [$L_3CuCl_2$] (0.090 g, 0.25 mmole) produced in Example 3-3 was used and the reaction temperature was changed to 0° C.

It was confirmed by NMR that the polymer was obtained with a conversion yield of up to 98%. The obtained PLA had the following properties: $M_w$=8.480 (g/mol)×$10^3$, $M_n$=6.892 (g/mol)×$10^3$, PDI=1.23, $P_r$=0.74, and $T_g$=49.0° C.

Example 6-8

The reaction was performed under the same conditions as those in Example 5-1, except that the catalyst [$L_4CuCl_2$] (0.091 g, 0.25 mmole) produced in Example 3-4 was used and the reaction temperature was changed to 0° C.

It was confirmed by NMR that the polymer was obtained with a conversion yield of up to 98%. The obtained PLA had the following properties: $M_w$=21.25 (g/mol)×$10^3$, $M_n$=16.99 (g/mol)×$10^3$, PDI=1.25, $P_r$=0.82, and $T_g$=51.9° C.

Example 6-9

The reaction was performed under the same conditions as those in Example 5-1, except that the catalyst [$L_1CoCl_2$] (0.077 g, 0.25 mmole) produced in Example 4-1 was used and the reaction temperature was changed to 0° C.

It was confirmed by NMR that the polymer was obtained with a conversion yield of up to 97%. The obtained PLA had the following properties: $M_w$=10.86 (g/mol)x$10^3$, $M_n$=8.708 (g/mol)x$10^3$, PDI=1.25, $P_r$=0.72, and $T_g$=46.9° C.

Example 6-10

The reaction was performed under the same conditions as those in Example 5-1, except that the catalyst [$L_2CoCl_2$] (0.077 g, 0.25 mmole) produced in Example 4-2 was used and the reaction temperature was changed to 0° C.

It was confirmed by NMR that the polymer was obtained with a conversion yield of up to 97%. The obtained PLA had the following properties: $M_w$=11.69 (g/mol)x$10^3$, $M_n$=9.417 (g/mol)x$10^3$, PDI=1.24, $P_r$=0.73, and $T_g$=46.4° C.

Example 6-11

The reaction was performed under the same conditions as those in Example 5-1, except that the catalyst [$L_3CoCl_2$] (0.089 g, 0.25 mmole) produced in Example 4-3 was used and the reaction temperature was changed to 0° C.

It was confirmed by NMR that the polymer was obtained with a conversion yield of up to 95%. The obtained PLA had the following properties: $M_w$=11.52 (g/mol)x$10^3$, $M_n$=9.374 (g/mol)x$10^3$, PDI=1.23, $P_r$=0.71, and $T_g$=46.1° C.

Example 6-12

The reaction was performed under the same conditions as those in Example 5-1, except that the catalyst [$L_4CoCl_2$] (0.090 g, 0.25 mmole) produced in Example 4-4 was used and the reaction temperature was changed to 0° C.

It was confirmed by NMR that the polymer was obtained with a conversion yield of up to 96%. The obtained PLA had the following properties: $M_w$=9.199 (g/mol)x$10^3$, $M_n$=7.524 (g/mol)x$10^3$, PDI=1.22, $P_r$=0.74, and $T_g$=47.4° C.

Table 6 below shows the results of the polymerization reactions performed according to Example 6.

TABLE 6

| Example | Catalyst | T (° C.) | Conv. (%) | $M_n$ (g/mol) ×$10^3$ (GPC) | $M_w$ (g/mol) ×$10^3$ (GPC) | PDI | $P_r$ |
|---|---|---|---|---|---|---|---|
| 6-1 | [L1ZnCl$_2$] | 47.7 | 97.7 | 9.237 | 11.55 | 1.25 | 0.69 |
| 6-2 | [L2ZnCl$_2$] | 47.8 | 98.1 | 9.786 | 11.86 | 1.21 | 0.74 |
| 6-3 | [L3ZnCl$_2$] | 48.4 | 97.0 | 10.02 | 12.31 | 1.23 | 0.68 |
| 6-4 | [L4ZnCl$_2$] | 47.4 | 97.3 | 8.044 | 9.766 | 1.21 | 0.70 |
| 6-5 | [L1Cu(μ-Cl)Cl]$_2$ | 49.8 | 98.1 | 9.895 | 12.32 | 1.25 | 0.70 |
| 6-6 | [L2Cu(μ-Cl)Cl]$_2$ | 51.9 | 97.9 | 14.30 | 17.68 | 1.24 | 0.75 |
| 6-7 | [L3CuCl$_2$] | 49.0 | 97.8 | 6.892 | 8.480 | 1.23 | 0.74 |
| 6-8 | [L4CuCl$_2$] | 51.9 | 98.1 | 16.99 | 21.25 | 1.25 | 0.82 |
| 6-9 | [L1CoCl$_2$] | 46.9 | 96.7 | 8.708 | 10.86 | 1.25 | 0.72 |
| 6-10 | [L2CoCl$_2$] | 46.4 | 96.6 | 9.417 | 11.69 | 1.24 | 0.73 |
| 6-11 | [L3CoCl$_2$] | 46.1 | 95.0 | 9.374 | 11.52 | 1.23 | 0.71 |
| 6-12 | [L4CoCl$_2$] | 47.4 | 95.9 | 7.524 | 9.199 | 1.22 | 0.74 |

* Conditions: [catalyst] = 0.0625 mmol, [rac-LA]:[catalyst]:[initiator] = 100:1:2, solvent ($CH_2Cl_2$) 5 mL, initiator = LiOiPr, polymerization time = 1 hour, and temperature = 0° C.

<Example 7> Polymer Production—Changed Initiator

Example 7-1

The reaction was performed under the same conditions as those in Example 5-1, except that the catalyst [$L_1ZnCl_2$] (0.078 g, 0.25 mmole) produced in Example 2-1 was used and the initiator was changed to LiMe (0.31 mL, 0.50 mmol).

It was confirmed by NMR that the polymer was obtained with a conversion yield of up to 99%. The obtained PLA had the following properties: $M_w$=17.44 (g/mol)x$10^3$, $M_1$=13.96 (g/mol)x$10^3$, PDI=1.25, $P_r$=0.59, and $T_g$=45.6° C.

Example 7-2

The reaction was performed under the same conditions as those in Example 5-1, except that the catalyst [$L_2ZnCl_2$] (0.079 g, 0.25 mmole) produced in Example 2-2 was used and the initiator was changed to LiMe (0.31 mL, 0.50 mmol).

It was confirmed by NMR that the polymer was obtained with a conversion yield of up to 99%. The obtained PLA had the following properties: $M_w$=13.80 (g/mol)x$10^3$, $M_n$=11.16 (g/mol)x$10^3$, PDI=1.24, $P_r$=0.64, and $T_g$=49.2° C.

Example 7-3

The reaction was performed under the same conditions as those in Example 5-1, except that the catalyst [$L_3ZnCl_2$] (0.091 g, 0.25 mmole) produced in Example 2-3 was used and the initiator was changed to LiMe (0.31 mL, 0.50 mmol).

It was confirmed by NMR that the polymer was obtained with a conversion yield of up to 99%. The obtained PLA had the following properties: $M_w$=16.46 (g/mol)x$10^3$, $M_n$=13.25 (g/mol)x$10^3$, PDI=1.24, $P_r$=0.62, and $T_g$=49.1° C.

Example 7-4

The reaction was performed under the same conditions as those in Example 5-1, except that the catalyst [$L_4ZnCl_2$] (0.091 g, 0.25 mmole) produced in Example 2-4 was used and the initiator was changed to LiMe (0.31 mL, 0.50 mmol).

It was confirmed by NMR that the polymer was obtained with a conversion yield of up to 99%. The obtained PLA had the following properties: $M_w$=15.05 (g/mol)x$10^3$, $M_n$=12.15 (g/mol)x$10^3$, PDI=1.24, $P_r$=0.67, and $T_g$=47.3° C.

Example 7-5

The reaction was performed under the same conditions as those in Example 5-1, except that the catalyst [$L_1$Cu(μ-Cl) Cl]$_2$ (0.078 g, 0.25 mmole) produced in Example 3-1 was used and the initiator was changed to LiMe (0.31 mL, 0.50 mmol).

It was confirmed by NMR that the polymer was obtained with a conversion yield of up to 99%. The obtained PLA had the following properties: $M_w$=17.68 (g/mol)x$10^3$, $M_n$=14.18 (g/mol)x$10^3$, PDI=1.25, $P_r$=0.55, and $T_g$=52.2° C.

Example 7-6

The reaction was performed under the same conditions as those in Example 5-1, except that the catalyst [$L_2$Cu(μ-Cl) Cl]$_2$ (0.078 g, 0.25 mmole) produced in Example 3-2 was used and the initiator was changed to LiMe (0.31 mL, 0.50 mmol).

It was confirmed by NMR that the polymer was obtained with a conversion yield of up to 99%. The obtained PLA had the following properties: $M_w$=20.60 (g/mol)x$10^3$, $M_n$=17.05 (g/mol)x$10^3$, PDI=1.21, $P_r$=0.59, and $T_g$=47.8° C.

Example 7-7

The reaction was performed under the same conditions as those in Example 5-1, except that the catalyst [$L_3CuCl_2$] (0.090 g, 0.25 mmole) produced in Example 3-3 was used and the initiator was changed to LiMe (0.31 mL, 0.50 mmol).

It was confirmed by NMR that the polymer was obtained with a conversion yield of up to 98%. The obtained PLA had the following properties: $M_w$=19.95 (g/mol)x$10^3$, $M_n$=16.14 (g/mol)x$10^3$, PDI=1.24, $P_r$=0.61, and $T_g$=50.6° C.

Example 7-8

The reaction was performed under the same conditions as those in Example 5-1, except that the catalyst [$L_4CuCl_2$] (0.091 g, 0.25 mmole) produced in Example 3-4 was used and the initiator was changed to LiMe (0.31 mL, 0.50 mmol).

It was confirmed by NMR that the polymer was obtained with a conversion yield of up to 99%. The obtained PLA had the following properties: $M_w$=18.13 (g/mol)x$10^3$, $M_n$=14.56 (g/mol)x$10^3$, PDI=1.25, $P_r$=0.59, and $T_g$=49.9° C.

Example 7-9

The reaction was performed under the same conditions as those in Example 5-1, except that the catalyst [$L_1CoCl_2$] (0.077 g, 0.25 mmole) produced in Example 4-1 was used and the initiator was changed to LiMe (0.31 mL, 0.50 mmol).

It was confirmed by NMR that the polymer was obtained with a conversion yield of up to 98%. The obtained PLA had the following properties: $M_w$=21.69 (g/mol)x$10^3$, $M_n$=17.42 (g/mol)x$10^3$, PDI=1.25, $P_r$=0.75, and $T_g$=49.1° C.

Example 7-10

The reaction was performed under the same conditions as those in Example 5-1, except that the catalyst [$L_2CoCl_2$] (0.077 g, 0.25 mmole) produced in Example 4-2 was used and the initiator was changed to LiMe (0.31 mL, 0.50 mmol).

It was confirmed by NMR that the polymer was obtained with a conversion yield of up to 98%. The obtained PLA had the following properties: $M_w$=20.95 (g/mol)x$10^3$, $M_n$=16.75 (g/mol)x$10^3$, PDI=1.25, $P_r$=0.78, and $T_g$=52.3° C.

Example 7-11

The reaction was performed under the same conditions as those in Example 5-1, except that the catalyst [$L_3CoCl_2$] (0.089 g, 0.25 mmole) produced in Example 4-3 was used and the initiator was changed to LiMe (0.31 mL, 0.50 mmol).

It was confirmed by NMR that the polymer was obtained with a conversion yield of up to 97%. The obtained PLA had the following properties: $M_w$=19.88 (g/mol)x$10^3$, $M_n$=16.09 (g/mol)x$10^3$, PDI=1.24, $P_r$=0.75, and $T_g$=53.6° C.

Example 7-12

The reaction was performed under the same conditions as those in Example 5-1, except that the catalyst [$L_4CoCl_2$] (0.090 g, 0.25 mmole) produced in Example 4-4 was used and the initiator was changed to LiMe (0.31 mL, 0.50 mmol).

It was confirmed by NMR that the polymer was obtained with a conversion yield of up to 99%. The obtained PLA had the following properties: $M_w$=19.42 (g/mol)x$10^3$, $M_n$=15.71 (g/mol)x$10^3$, PDI=1.24, $P_r$=0.77, and $T_g$=53.7° C.

Table 7 below shows the results of the polymerization reactions performed according to Example 7.

TABLE 7

| Example | Catalyst | T (° C.) | Conv. (%) | $M_n$ (g/mol) x$10^3$ (GPC) | $M_w$ (g/mol) x$10^3$ (GPC) | PDI | $P_r$ |
|---|---|---|---|---|---|---|---|
| 7-1 | [$L1ZnCl_2$] | 45.6 | 98.6 | 13.96 | 17.44 | 1.25 | 0.59 |
| 7-2 | [$L2ZnCl_2$] | 49.2 | 99.2 | 11.16 | 13.80 | 1.24 | 0.64 |
| 7-3 | [$L3ZnCl_2$] | 49.1 | 98.6 | 13.25 | 16.46 | 1.24 | 0.62 |
| 7-4 | [$L4ZnCl_2$] | 47.3 | 98.6 | 12.15 | 15.05 | 1.24 | 0.67 |
| 7-5 | [L1Cu(μ-Cl)Cl]$_2$ | 52.2 | 98.6 | 14.18 | 17.68 | 1.25 | 0.55 |
| 7-6 | [L2Cu(μ-Cl)Cl]$_2$ | 47.8 | 99.3 | 17.05 | 20.60 | 1.21 | 0.59 |
| 7-7 | [$L3CuCl_2$] | 50.6 | 97.9 | 16.14 | 19.95 | 1.24 | 0.61 |
| 7-8 | [$L4CuCl_2$] | 49.9 | 98.6 | 14.56 | 18.13 | 1.25 | 0.59 |
| 7-9 | [$L1CoCl_2$] | 49.1 | 98.6 | 17.42 | 21.69 | 1.25 | 0.75 |
| 7-10 | [$L2CoCl_2$] | 52.3 | 98.9 | 16.75 | 20.95 | 1.25 | 0.78 |
| 7-11 | [$L3CoCl_2$] | 53.6 | 98.6 | 16.09 | 19.88 | 1.24 | 0.75 |
| 7-12 | [$L4CoCl_2$] | 53.7 | 98.4 | 15.71 | 19.42 | 1.24 | 0.77 |

* Conditions: [catalyst] = 0.0625 mmol, [rac-LA]:[catalyst]:[initiator] = 100:1:2, solvent ($CH_2Cl_2$) 5 mL, initiator = LiMe, polymerization time = 1 hour, and temperature = 25° C.

<Example 8> Polymer Production—Changed Initiator and Reaction Temperature

Example 8-1

The reaction was performed under the same conditions as those in Example 5-1, except that the catalyst [$L_1ZnCl_2$] (0.078 g, 0.25 mmole) produced in Example 2-1 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=10.68 (g/mol)x$10^3$, $M_1$=8.680 (g/mol)x$10^3$, PDI=1.23, $P_r$=0.83, and $T_g$=49.0° C.

Example 8-2

The reaction was performed under the same conditions as those in Example 5-1, except that the catalyst [$L_2ZnCl_2$] (0.079 g, 0.25 mmole) produced in Example 2-2 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=8.191 (g/mol)x$10^3$, $M_n$=6.642 (g/mol)x$10^3$, PDI=1.23, $P_r$=0.85, and $T_g$=43.0° C.

Example 8-3

The reaction was performed under the same conditions as those in Example 5-1, except that the catalyst [$L_3ZnCl_2$] (0.090 g, 0.25 mmole) produced in Example 2-3 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=8.930 (g/mol)x$10^3$, $M_n$=7.287 (g/mol)x$10^3$, PDI=1.23, $P_r$=0.83, and $T_g$=45.7° C.

Example 8-4

The reaction was performed under the same conditions as those in Example 5-1, except that the catalyst [$L_4ZnCl_2$] (0.091 g, 0.25 mmole) produced in Example 2-4 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=10.32 (g/mol)x$10^3$, $M_n$=8.316 (g/mol)x$10^3$, PDI=1.24, $P_r$=0.86, and $T_g$=46.7° C.

Example 8-5

The reaction was performed under the same conditions as those in Example 5-1, except that the catalyst [$L_1$Cu(μ-Cl) Cl]$_2$ (0.078 g, 0.25 mmole) produced in Example 3-1 and LiMe (0.31 mL, 0.50 mmol) as an initiator were used and the reaction temperature was changed to 0° C.

It was confirmed by NMR that the polymer was obtained with a conversion yield of up to 100%. The obtained PLA had the following properties: $M_w$=17.14 (g/mol)x$10^3$, $M_n$=13.90 (g/mol)x$10^3$, PDI=1.23, $P_r$=0.80, and $T_g$=51.0° C.

Example 8-6

The reaction was performed under the same conditions as those in Example 5-1, except that the catalyst [$L_2$Cu(μ-Cl) Cl]$_2$ (0.078 g, 0.25 mmole) produced in Example 3-2 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=18.55 (g/mol)x$10^3$, $M_n$=14.96 (g/mol)x$10^3$, PDI=1.24, $P_r$=0.79, and $T_g$=47.3° C.

Example 8-7

The reaction was performed under the same conditions as those in Example 5-1, except that the catalyst [$L_3CuCl_2$] (0.090 g, 0.25 mmole) produced in Example 3-3 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=16.01 (g/mol)x$10^3$, $M_n$=13.00 (g/mol)x$10^3$, PDI=1.24, $P_r$=0.76, and $T_g$=49.0° C.

Example 8-8

The reaction was performed under the same conditions as those in Example 5-1, except that the catalyst [$L_4CuCl_2$] (0.091 g, 0.25 mmole) produced in Example 3-4 and LiMe (0.31 mL, 0.50 mmol) as an initiator were used and the reaction temperature was changed to 0° C.

It was confirmed by NMR that the polymer was obtained with a conversion yield of up to 98%. The obtained PLA had the following properties: $M_w$=15.16 (g/mol)x$10^3$, $M_n$=12.10 (g/mol)x$10^3$, PDI=1.25, $P_r$=0.78, and $T_g$=49.2° C.

Example 8-9

The reaction was performed under the same conditions as those in Example 5-1, except that the catalyst [$L_1CoCl_2$] (0.077 g, 0.25 mmole) produced in Example 4-1 and LiMe (0.31 mL, 0.50 mmol) as an initiator were used and the reaction temperature was changed to 0° C.

It was confirmed by NMR that the polymer was obtained with a conversion yield of up to 99%. The obtained PLA had the following properties: $M_w$=15.53 (g/mol)x$10^3$, $M_n$=12.52 (g/mol)x$10^3$, PDI=1.24, $P_r$=0.87, and $T_g$=48.8° C.

Example 8-10

The reaction was performed under the same conditions as those in Example 5-1, except that the catalyst [$L_2CoCl_2$] (0.077 g, 0.25 mmole) produced in Example 4-2 and LiMe (0.31 mL, 0.50 mmol) as an initiator were used and the reaction temperature was changed to 0° C.

It was confirmed by NMR that the polymer was obtained with a conversion yield of up to 98%. The obtained PLA had the following properties: $M_w$=17.45 (g/mol)x$10^3$, $M_n$=14.10 (g/mol)x$10^3$, PDI=1.24, $P_r$=0.88, and $T_g$=55.2° C.

Example 8-11

The reaction was performed under the same conditions as those in Example 5-1, except that the catalyst [$L_3CoCl_2$] (0.089 g, 0.25 mmole) produced in Example 4-3 and LiMe (0.31 mL, 0.50 mmol) as an initiator were used and the reaction temperature was changed to 0° C.

It was confirmed by NMR that the polymer was obtained with a conversion yield of up to 96%. The obtained PLA had the following properties: $M_w$=11.49 (g/mol)x$10^3$, $M_1$=9.259 (g/mol)x$10^3$, PDI=1.24, $P_r$=0.89, and $T_g$=54.0° C.

Example 8-12

The reaction was performed under the same conditions as those in Example 5-1, except that the catalyst [$L_4CoCl_2$] (0.090 g, 0.25 mmole) produced in Example 4-4 and LiMe (0.31 mL, 0.50 mmol) as an initiator were used and the reaction temperature was changed to 0° C.

It was confirmed by NMR that the polymer was obtained with a conversion yield of up to 98%. The obtained PLA had the following properties: $M_w$=13.26 (g/mol)x$10^3$, Mn=10.65 (g/mol)x$10^3$, PDI=1.25, $P_r$=0.90, and $T_g$=53.6° C.

Table 8 below shows the results of the polymerization reactions performed according to Example 8.

TABLE 8

| Example | Catalyst | T (° C.) | Conv. (%) | $M_n$ (g/mol) x$10^3$ (GPC) | $M_w$ (g/mol) x$10^3$ (GPC) | PDI | $P_r$ |
|---|---|---|---|---|---|---|---|
| 8-1 | [$L1ZnCl_2$] | 49.0 | 98.6 | 8.680 | 10.68 | 1.23 | 0.83 |
| 8-2 | [$L2ZnCl_2$] | 43.0 | 99.3 | 6.642 | 8.191 | 1.23 | 0.85 |
| 8-3 | [$L3ZnCl_2$] | 45.7 | 98.6 | 7.287 | 8.930 | 1.23 | 0.83 |
| 8-4 | [$L4ZnCl_2$] | 46.7 | 98.6 | 8.316 | 10.32 | 1.24 | 0.86 |
| 8-5 | [L1Cu(μ-Cl)Cl]$_2$ | 51.0 | 99.5 | 13.90 | 17.14 | 1.23 | 0.80 |
| 8-6 | [L2Cu(μ-Cl)Cl]$_2$ | 47.3 | 99.3 | 14.96 | 18.55 | 1.24 | 0.79 |
| 8-7 | [$L3CuCl_2$] | 49.0 | 98.5 | 13.00 | 16.01 | 1.24 | 0.76 |
| 8-8 | [$L4CuCl_2$] | 49.2 | 97.8 | 12.10 | 15.16 | 1.25 | 0.78 |
| 8-9 | [$L1CoCl_2$] | 48.8 | 98.8 | 12.52 | 15.53 | 1.24 | 0.87 |
| 8-10 | [$L2CoCl_2$] | 55.2 | 97.8 | 14.10 | 17.45 | 1.24 | 0.88 |
| 8-11 | [$L3CoCl_2$] | 54.0 | 96.1 | 9.259 | 11.49 | 1.24 | 0.89 |
| 8-12 | [$L4CoCl_2$] | 53.6 | 98.0 | 10.65 | 13.26 | 1.25 | 0.90 |

* Conditions: [catalyst] = 0.0625 mmol, [rac-LA]:[catalyst]:[initiator] = 100:1:2, solvent ($CH_2Cl_2$) 5 mL, initiator = LiMe, polymerization time = 1 hour, and temperature = 0° C.

"Hetero-" in heterotacticity ($P_r$) refers to a different structure or function, and "-tacticity" refers to the relative stereochemistry of adjacent chiral centers within a polymer. In other words, there are five types of heterotacticity (sis, sii, iss, iii, and isi) due to the presence of two asymmetric centers in one polylactide molecule, and the physical properties of the polymer change depending on these tacticities. Accordingly, as the monomer of the aliphatic polyester is released under the influence of an initiator, an ester group and a methyl group are generated and two chiral centers exist in one molecule centered on the methyl group. At this time, selective heterotacticity is seen with respect to the chiral centers. That is, selective heterotacticity [isotactic, syndiotactic, or atactic] preferred for each condition can be seen through the homonuclear decoupled $^1$H-NMR spectrum.

First, regarding the type of heterotacticity, a polymer in which methyl groups are positioned and bonded in the same direction is called isotactic, a polymer in which methyl groups are bonded regularly in crossed directions is called syndiotactic, and a polymer in which methyl groups are bonded without regularity is called atactic.

In the isotactic or syndiotactic having a regular arrangement, molecules having a regular arrangement are regularly arranged or piled up with a polymer having a shape similar thereto to form a crystal. That is, the isotactic and syndiotactic having a regular arrangement are preferred in the industrial field, and have a great advantage in that they can be commercially associated.

If it is confirmed through the $^1$H-NMR spectrum that polylactide was produced, how the polymer is arranged, that is, heterotacticity, can be confirmed through the homonuclear decoupled $^1$H-NMR spectrum.

Then, in the present invention, the temperature condition was lowered to lower the reactivity and obtain better selectivity heterotacticity, and it can be confirmed that sis and isi having a regular arrangement are preferably obtained as the temperature decreases.

Although the present invention has been described in detail with reference to the specific features, it will be apparent to those skilled in the art that this description is only of a preferred embodiment thereof, and does not limit the scope of the present invention. Thus, the substantial scope of the present invention will be defined by the appended claims and equivalents thereto. The scope of the present invention is defined by the appended claims, and all changes or modifications derived from the meaning and scope of the claims and equivalents thereto should be construed as being within the scope of the present invention.

The invention claimed is:

1. A transition metal compound represented by Formula 1 or 2 below:

[Formula 1]

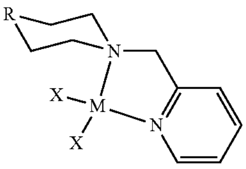

-continued

[Formula 2]

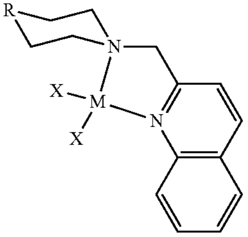

wherein M is selected from among transition metals, R is selected from among a $C_1$-$C_4$ alkyl group and oxygen (O), and X is selected from among halogen elements.

2. The transition metal compound according to claim 1, wherein the compound represented by Formula 1 is formed as a dimer represented by Formula 3 below:

[Formula 3]

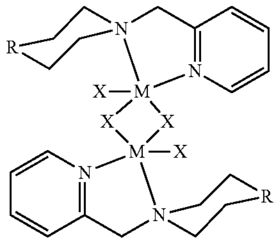

wherein M is selected from among transition metals, R is selected from among a $C_1$-$C_4$ alkyl group and oxygen (O), and X is selected from among halogen elements.

3. The transition metal compound according to claim 1, wherein M in Formula 1 or 2 is any one selected from among zinc (Zn), copper (Cu), and cobalt (Co).

4. The transition metal compound according to claim 1, which is represented by any one of the following Formulas:

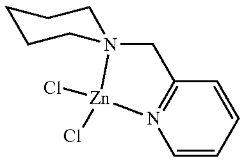

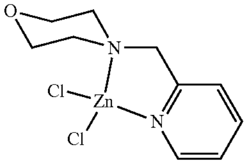

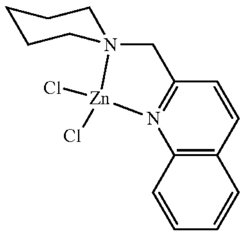

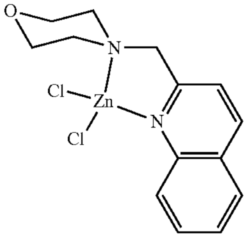

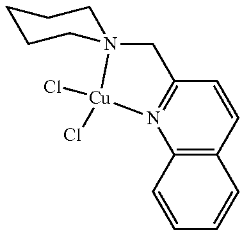

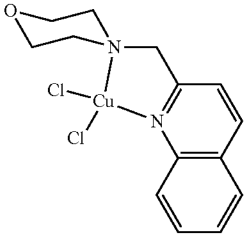

-continued

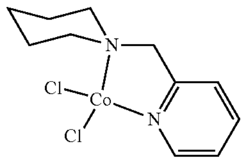

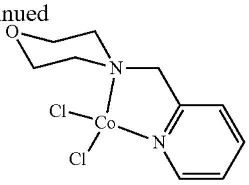

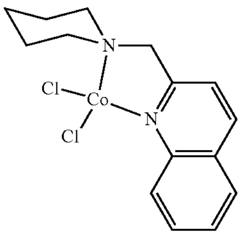

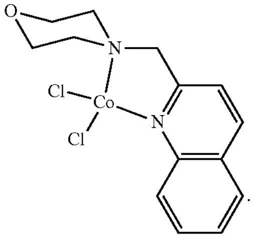

5. The transition metal compound according to claim 2, which is represented by any one of the following Formulas:

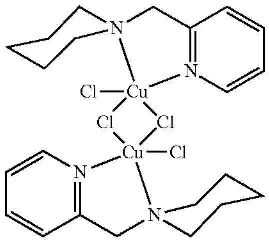

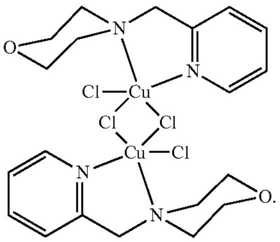

6. A catalyst composition for polymerization of a monomer having a cyclic ester group, the catalyst composition comprising the transition metal compound according to claim 1.

7. The catalyst composition according to claim 6, wherein the monomer is any one or more selected from the group consisting of lactide, glycolide, and ε-caprolactone.

8. The catalyst composition according to claim 6, which controls heterotacticity ($P_r$) during polymerization of the monomer.

9. The catalyst composition according to claim 6, further comprising a cocatalyst or an initiator.

10. A method for producing a polymer of a monomer having a cyclic ester group, the method comprising steps of:

activating a catalyst of the catalyst composition according to claim 6 by mixing the catalyst composition with an initiator; and polymerizing a monomer having a cyclic ester group by adding the activated catalyst to the monomer.

11. The method according to claim 10, wherein the step of activating the catalyst is performed by mixing the catalyst composition and the initiator at a molar ratio of 1:(1 to 3).

12. The method according to claim 10, wherein the initiator is any one or more selected from among LiOiPr, LiMe, and BnOH.

13. The method according to claim 10, wherein the step of polymerizing the monomer is performed by adding the activated catalyst at a ratio of 0.1 to 10 moles based on 100 moles of the monomer.

14. The method according to claim 10, wherein the step of polymerizing the monomer is performed at a temperature of 0 to 30° C. for 0.5 to 2 hours.

15. The method according to claim 10, wherein a conversion yield of the monomer to the polymer is 95% or more.

16. The method according to claim 10, wherein the polymer of the monomer having the cyclic ester group has a heterotacticity ($P_r$) of 55% or more.

* * * * *